(12) United States Patent
Valyukh et al.

(10) Patent No.: US 9,046,729 B2
(45) Date of Patent: Jun. 2, 2015

(54) CHOLESTERIC LIQUID CRYSTAL STRUCTURE

(75) Inventors: Sergiy I. Valyukh, Mantorp (SE); Vladimir Grigorievich Chigrinov, Hong Kong (CN); Hoi Sing Kwok, Hong Kong (CN); Iryna V. Valyukh, Mantorp (SE)

(73) Assignee: The Hong Kong University of Science and Technology, Kowloon (HK)

( * ) Notice: Subject to any disclaimer, the term of this patent is extended or adjusted under 35 U.S.C. 154(b) by 166 days.

(21) Appl. No.: 13/428,895

(22) Filed: Mar. 23, 2012

(65) Prior Publication Data

US 2012/0242918 A1    Sep. 27, 2012

Related U.S. Application Data

(60) Provisional application No. 61/457,425, filed on Mar. 24, 2011.

(51) Int. Cl.
*G02F 1/1335*    (2006.01)
*G02F 1/137*    (2006.01)
*G02F 1/19*    (2006.01)
*G02F 1/1347*    (2006.01)

(52) U.S. Cl.
CPC ............... *G02F 1/13718* (2013.01); *G02F 1/19* (2013.01); *G02F 2001/13478* (2013.01)

(58) Field of Classification Search
USPC .......................................................... 349/115
See application file for complete search history.

(56) References Cited

U.S. PATENT DOCUMENTS

| 5,408,346 | A |   | 4/1995 | Trissel et al. |
|---|---|---|---|---|
| 5,940,150 | A | * | 8/1999 | Faris et al. ..................... 349/16 |
| 6,570,633 | B1 | * | 5/2003 | Stephenson ..................... 349/86 |
| 6,894,733 | B2 | * | 5/2005 | Izumi et al. ..................... 349/35 |
| 7,035,501 | B2 |   | 4/2006 | Pan et al. |
| 7,161,737 | B2 | * | 1/2007 | Umeya .......................... 359/454 |
| 7,369,327 | B1 | * | 5/2008 | Nishioka ....................... 359/726 |
| 7,394,506 | B2 | * | 7/2008 | Cirkel et al. .................... 349/15 |
| 7,589,809 | B2 | * | 9/2009 | Maeda et al. ................. 349/115 |
| 2003/0071937 | A1 | * | 4/2003 | Li et al. ........................... 349/87 |
| 2005/0180471 | A1 |   | 8/2005 | Chen et al. |
| 2006/0257586 | A1 | * | 11/2006 | Umeya ........................... 428/1.1 |

OTHER PUBLICATIONS

Cheng et al., "Electrically switchable and optically rewritable reflective Fresnel zone plate in dye-doped cholesteric liquid crystals," Optics Express, 15 (21): 14078-14085 (Oct. 11, 2007).

(Continued)

*Primary Examiner* — Edward Glick
*Assistant Examiner* — Alexander Gross
(74) *Attorney, Agent, or Firm* — Leydig, Voit & Mayer, Ltd.

(57) ABSTRACT

A liquid crystal optical device that includes a first substrate layer that is substantially flat and a second substrate layer that is substantially flat and parallel to the first substrate layer. The liquid crystal optical device further includes a layer of cholesteric liquid crystal disposed between the first substrate layer and the second substrate layer, where the layer of cholesteric liquid crystal is arranged in domains, each domain having a helical axis, wherein the helical axes of the domains have a plurality of orientations relative to an orientation of the first and second substrate layers, and where a wavefront of a light wave having a wavelength within a range of wavelengths changes after reflecting from the layer of cholesteric liquid crystal.

5 Claims, 13 Drawing Sheets (56) References Cited

OTHER PUBLICATIONS

Kim et al., "Long-pitch cholesteric liquid crystal cell for switchable achromatic reflection," Optics Express, 18 (16): 16745-16750 (Jul. 23, 2010).

Zhang et al., "Broadband reflection characteristic of polymer-stabilised cholesteric liquid crystal with pitch gradient induced by a hydrogen bond," Liquid Crystals, 37: 10, 1275-1280 (Published online Oct. 20, 2010).

* cited by examiner

CHOLESTERIC LIQUID CRYSTAL STRUCTURE

CROSS-REFERENCE TO RELATED APPLICATIONS

This patent application claims the benefit of U.S. Provisional Patent Application No. 61/457,425, filed Mar. 24, 2011, which is incorporated by reference.

FIELD

Embodiments disclosed herein relate to optical devices and, more specifically, to a cholesteric liquid crystal structure.

BACKGROUND

Lenses are commonly used in optical systems to direct and/or reconfigure light. In data communication systems, for example, lenses are used to direct and/or reconfigure light provided by a light source to a detector, optical fiber, or some other destination.

Lenses can be configured to act in a transmissive manner to allow at least a portion of the light that is output from the light source to pass through the lenses. However, another portion of the light from the light source can be reflected from the lenses. In some implementations, the reflected light can be directed to a back monitor photo detector that is configured to detect the amount of reflected light. The back monitor photo detector is configured to generate a signal corresponding to the amount of reflected light. The signal can be provided to a controller that adjusts the power of the light source to a desired power level. Typically, the desired power level is a constant power level. Maintaining a constant power level can be beneficial since some electrical and/or optical parameters of some light sources, such as lasers, can vary due to effects such as manufacturing tolerance, temperature, and aging. As such, control of the power level of the light source can enhance the performance of systems that use these light sources.

Various conventional techniques have been used to reflect light from lenses, such as, for example, to a back monitor photo detector. In one conventional approach, a tilted window (separate from the lens) is provided above the back monitor photo detector and the light source, where the tilted window includes a partially reflective coating. The tilted window reflects a portion of the light beam from the light source to the back monitor photo detector. Accordingly, in such an implementation, both a partially reflective window and a separate lens are provided in the path of the light beam. Having to manufacture and mount both of these separate components can increase the cost of the system. In addition, in some applications, there is insufficient room between the light source and the desired destination to accommodate both a partially reflective window and a separate lens.

Another conventional approach is to provide a concave lens that includes a transmissive part for passing a portion of an incident light beam and a reflective part for reflecting a portion of the incident light beam. The reflective part is preferably substantially non-transmissive. However, implementing a concave lens has various drawbacks, such as putting restrictions on the size and shape of lens that can be used for various applications. Therefore, concave lenses cannot be used in certain applications.

Accordingly, what is needed in the art is a reflective lens that overcomes drawbacks of conventional lenses discussed above.

SUMMARY

One embodiment provides a liquid crystal optical device. The liquid crystal optical device includes a first substrate layer that is substantially flat; a second substrate layer that is substantially flat and parallel to the first substrate layer; and a layer of cholesteric liquid crystal disposed between the first substrate layer and the second substrate layer, where the layer of cholesteric liquid crystal is arranged in domains, each domain having a helical axis, and wherein the helical axes of the domains have a plurality of orientations relative to an orientation of the first and second substrate layers, where a wavefront of a light wave having a wavelength within a range of wavelengths changes after reflecting from the layer of cholesteric liquid crystal.

Another embodiment provides a method for reflecting light from a liquid crystal optical device. The method includes applying a voltage to a first electrode and to a second electrode, where a layer of cholesteric liquid crystal is disposed between the first electrode and the second electrode, where the cholesteric liquid crystal is arranged in domains, and where a wavefront of a light wave having a wavelength within a range of wavelengths changes after reflecting from the layer of cholesteric liquid crystal; and varying the voltage to modify the amount of change of the wavefront of the light wave after reflecting from the layer of cholesteric liquid crystal.

DETAILED DESCRIPTION

Embodiments of the invention provide a liquid crystal optical device that includes at least one layer of cholesteric liquid crystal. The cholesteric liquid crystal is arranged in domains of helicoidal structures twisted around helical axes. The helical axes of the domains have different orientations such that incident light waves having a wavelength within a certain range, when reflected from the liquid crystal optical device, change the forms of the wavefronts of the incident light waves. Accordingly, the incident light waves can be focused onto a particular target. An example of such a target is a back monitor photo detector used to control the power output level of a light source.

Liquid crystal layers are commonly used in optoelectronic devices, such as electronic displays, lenses with a tunable focal distance, shutters, and modulators, among others. The liquid crystal in such optoelectronic devices can be categorized into different phases associated with the type of ordering of the liquid crystal. Examples of different phases include the nematic phase, smectic phases, and chiral phases. In the nematic phase, the liquid crystals have no positional order, but they self-align to have long-range directional order with their long axes roughly parallel. In the smectic phase, the liquid crystals form well-defined layers and are, thus, positionally ordered along one direction. In the chiral phases, the liquid crystals exhibit handedness, characterized by layers of molecules, where the molecules in one layer are rotated relative the molecules in the adjacent layers.

In electronic displays, the liquid crystals are typically in the nematic phase. Lenses are also typically composed of nematic liquid crystals. Nematic lenses have a non-uniform distribution of refractive index due to the non-uniform distribution of orientations of the liquid crystal molecules. Nematic lenses are transmissive. Smectic liquid crystals are primarily used in modulators and shutters.

Embodiments of the invention provide a cholesteric liquid crystal structure. The cholesteric liquid crystal structure described herein can have three different states: a planar state, a focal conic state, and a homeotropic state.

Figure 1:
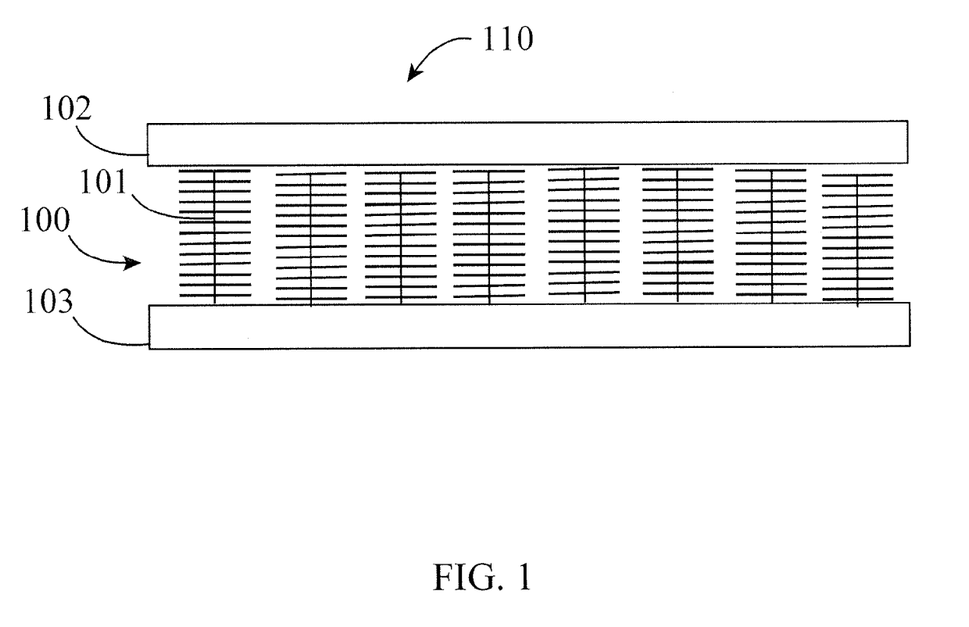
FIG. 1 is a schematic view of a cholesteric liquid crystal structure in a planar state, according to one embodiment.

FIG. 1 is a schematic view of a cholesteric liquid crystal structure 110 in a planar state, according to one embodiment. As shown, the cholesteric liquid crystal structure 110 includes a substrate 102, a substrate 103, and molecules of cholesteric liquid crystal 100. The molecules of the cholesteric liquid crystal 100 are organized into domains, where each domain is a helicoidal structure twisted around a helical axis 101, known as an optical axis. The cholesteric liquid crystal 100 is placed between two substrates 102 and 103. In one embodiment, substrate 102 is transparent. The cholesteric liquid crystal structure 110 in the planar state is periodic and reflects incoming light according to Bragg's Law. Bragg's Law is a well-know principle of physics that defines the angles of coherent and incoherent scattering from a crystal lattice.

Figure 2:
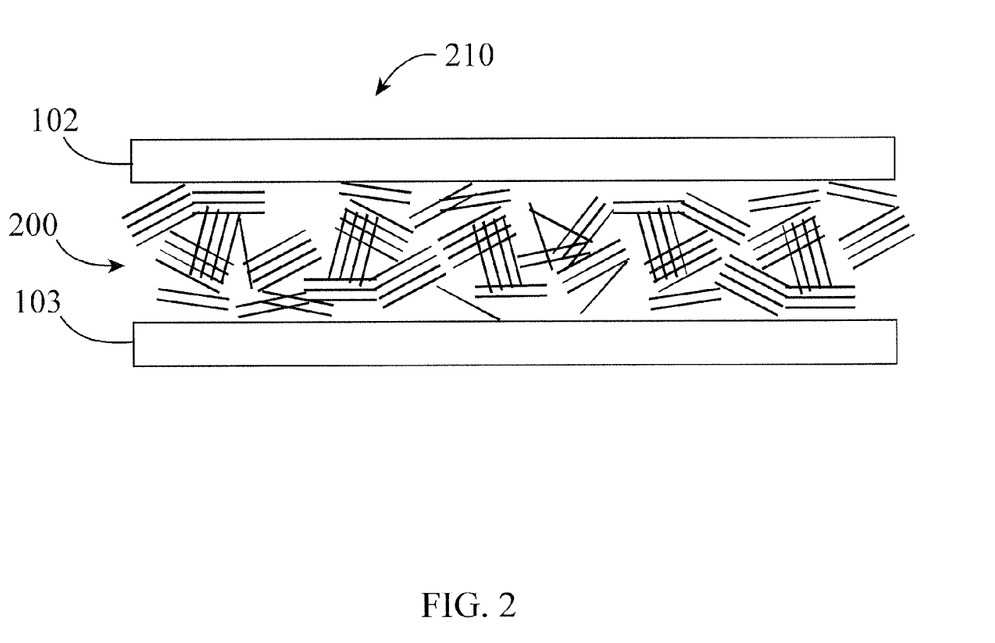
FIG. 2 is a schematic view of a cholesteric liquid crystal structure in a focal conic state, according to one embodiment.

FIG. 2 is a schematic view of a cholesteric liquid crystal structure 210 in a focal conic state, according to one embodiment. As shown, the cholesteric liquid crystal structure 210 includes substrate 102, substrate 103, and molecules of cholesteric liquid crystal 200. In the focal conic state, the cholesteric liquid crystal 200 does not form uniformly orientated full domains, such as in the planar state. When incident light interacts with the cholesteric liquid crystal 200 in the focal conic state, a portion of the light is transmitted and a portion of the light is scattered diffusely. A ratio between the portion of the light transmitted and the portion of the light scattered diffusely depends on the thickness of the layer of cholesteric liquid crystal 200 between the substrates 102, 103. If the thickness of the layer of the cholesteric liquid crystal 200 is less than 10 μm, then the light is primarily transmitted through the cholesteric liquid crystal 200 and the layer is substantially transparent.

Figure 3:
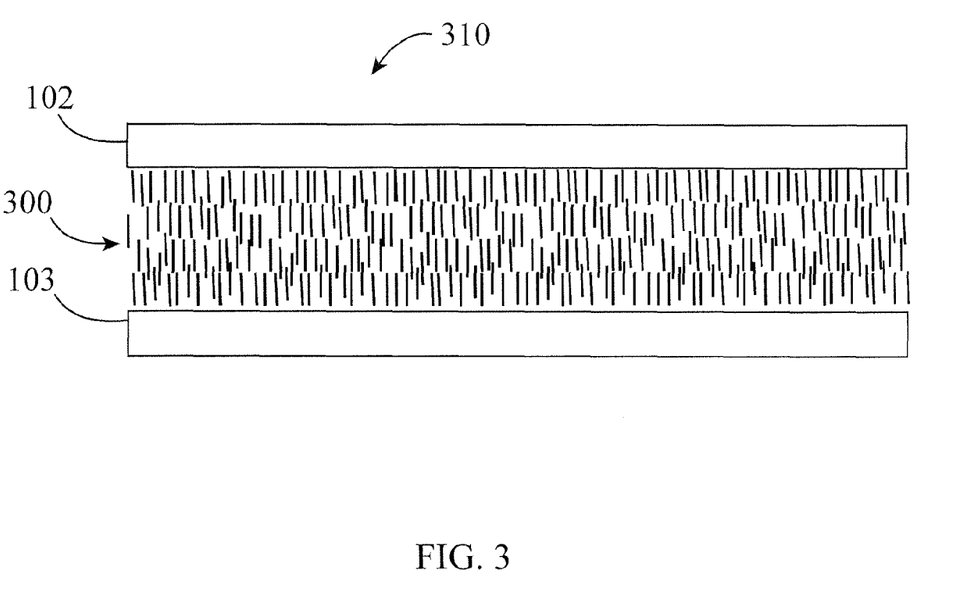
FIG. 3 is a schematic view of a cholesteric liquid crystal structure in a homeotropic state, according to one embodiment.

FIG. 3 is a schematic view of a cholesteric liquid crystal structure 310 in a homeotropic state, according to one embodiment. As shown, the cholesteric liquid crystal structure 310 includes substrate 102, substrate 103, and molecules of cholesteric liquid crystal 300. In the homeotropic state, the cholesteric liquid crystal 300 aligns in layers, oriented perpendicular to the substrates 102, 103. In one embodiment, the cholesteric liquid crystal 300 arranges itself in the homeotropic state when an external electric or magnetic field is applied to the cholesteric liquid crystal structure 310. The cholesteric liquid crystal structure 310 is substantially transparent in the homeotropic state.

According to various embodiments, planar and focal conic states are stable at zero voltage. Transition between theses states occurs after an electrical or magnetic impulse is applied. For example, when an electrical impulse of high voltage is applied, the liquid crystal structure transforms to the homeotropic state. After turning off the voltage, the liquid crystal transitions to the planar state. If a low intensity electrical impulse is applied, then the liquid crystal structure transitions to the focal conic state.

Figure 4:
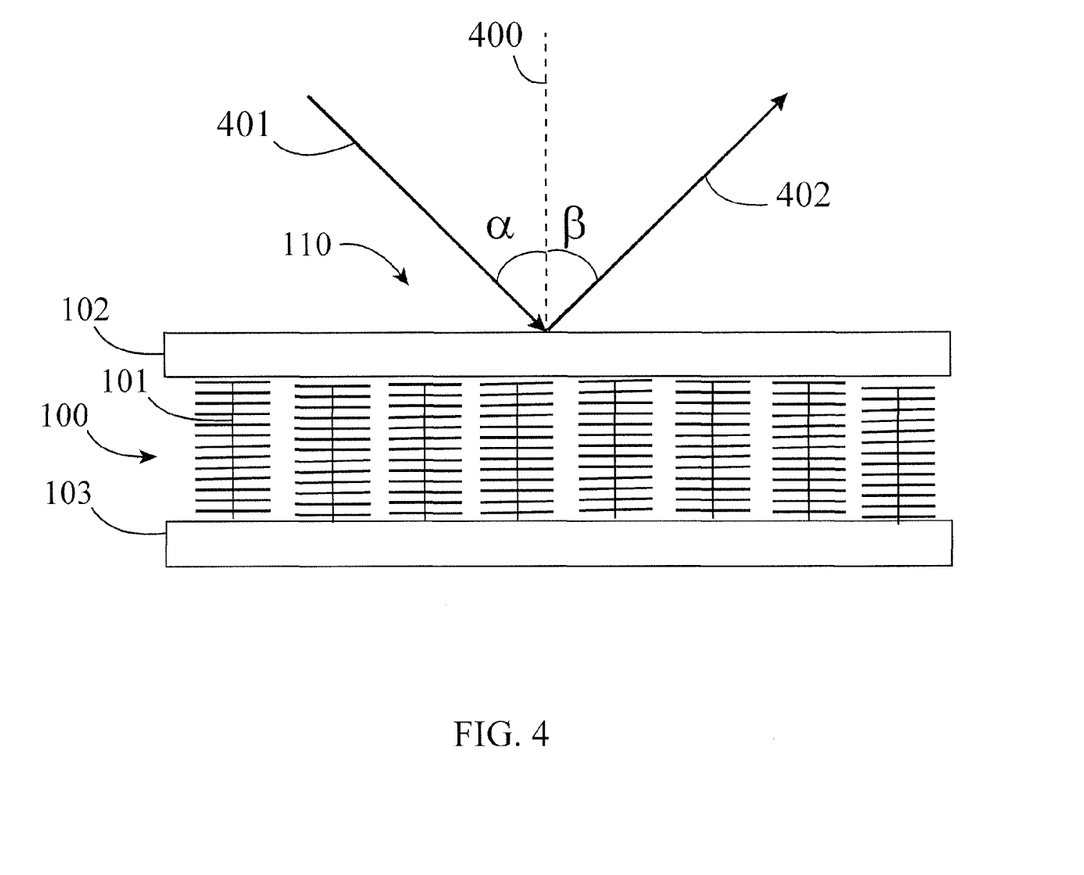
FIG. 4 is a schematic view of a light beam reflected from a cholesteric liquid crystal structure in a planar state, according to one embodiment.

FIG. 4 is a schematic view of a light beam reflected from a cholesteric liquid crystal structure 110 in a planar state, according to one embodiment. In one embodiment, the cholesteric liquid crystal structure 110 in FIG. 4 is the same as the cholesteric liquid crystal structure 110 illustrated in FIG. 1. A light beam 401 is incident upon the cholesteric liquid crystal structure 110 at an angle of incidence α, defined by the angle between the light beam 401 and normal axis 400. The light beam 401 is reflected from the cholesteric liquid crystal structure 110 (i.e., the illustrated reflectance beam 402) at an angle of reflectance β, defined by the angle between the reflectance beam 402 and the axis 400. When the helical axes 101 of the domains of cholesteric liquid crystal 100 are perpendicular to the substrates 102 and 103, as shown in FIG. 4, the incident light beam 401 is reflected in a mirror-like manner. Accordingly, the angle of reflectance β, in this case, is equal to the angle of incidence α.

Figure 5:
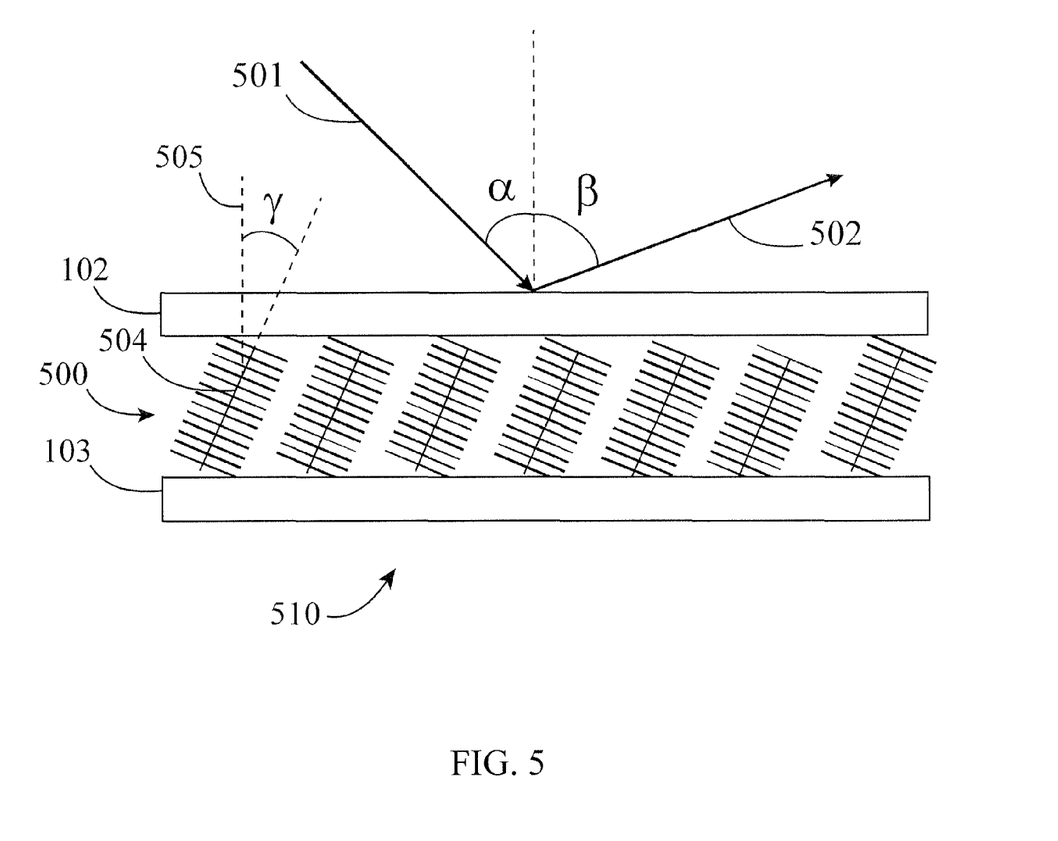
FIG. 5 is a schematic view of a light beam reflected from a cholesteric liquid crystal structure in a planar state with inclined domains of the cholesteric liquid crystal, according to one embodiment.

FIG. 5 is a schematic view of a light beam reflected from a cholesteric liquid crystal structure 510 in a planar state with inclined domains of the cholesteric liquid crystal, according to one embodiment. As shown, the cholesteric liquid crystal structure 510 includes substrate 102, substrate 103, and molecules of cholesteric liquid crystal 500. When the helical axes 504 of the cholesteric liquid crystal 500 are inclined relative to the substrates 102 and 103, each helical axis aligned at the same angle (i.e., angle γ relative to normal axis 505), the incident light beam 501 is not reflected mirror-like to form reflectance beam 502. In this case, the angle of reflectance β is not equal to the angle of incidence α and depends on incline of the helical axis 501. The relationship between the angle of incidence α, the angle of reflectance β, and the angle γ describing inclination of the helical axis is:

$$\bar{n}\sin\left(2\gamma + \sin^{-1}\left(\frac{\sin\alpha}{\bar{n}}\right)\right) = \sin\beta, \quad \text{(Equation 1)}$$

where $\bar{n}$ is the average refractive index of the cholesteric liquid crystal 500.

Figure 6:
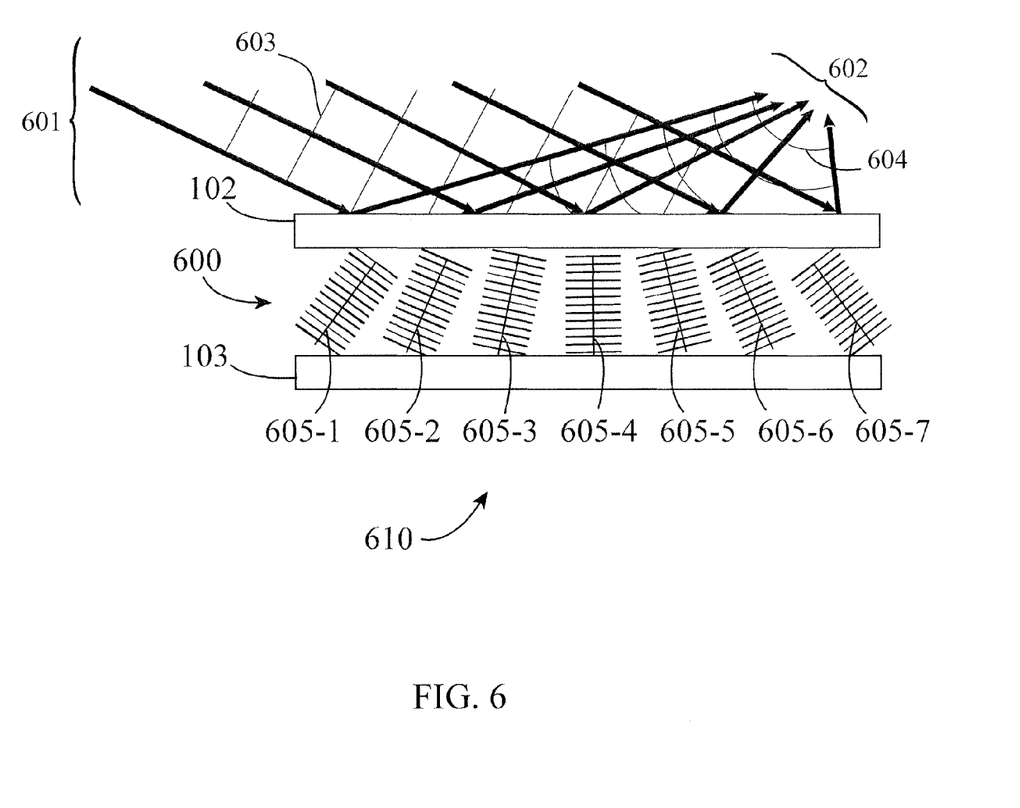
FIG. 6 is a schematic view of light beams reflected from a cholesteric liquid crystal structure in a planar state with inclined domains of the cholesteric liquid crystal having a distribution of orientations, according to one embodiment.

FIG. 6 is a schematic view of light beams reflected from a cholesteric liquid crystal structure 610 in a planar state with inclined domains of the cholesteric liquid crystal having a distribution of orientations, according to one embodiment. As shown, the cholesteric liquid crystal structure 610 includes substrate 102, substrate 103, and molecules of cholesteric liquid crystal 600. As also shown, the helical axes 605-1 to 605-7 of the domains of cholesteric liquid crystal 600 do not have uniform orientation relative to the orientation of the substrates 102 and 103; rather, the domains of cholesteric liquid crystal 600 have a plurality of orientations relative to the orientation of the substrates 102, 103.

As a result, for each of a plurality of incident light beams 601 and corresponding reflectance beams 602, the angle of incidence is not equal to the angle of reflectance. The incident light beams 601 are associated with a wavefront 603 identified in FIG. 6 with hash marks between the incident light beams 601. A wavefront is the curve or surface that includes the points in space reached by a wave or vibration at the same instant in time as the wave travels through a medium. Also, the reflectance beams 602 are associated with a wavefront 604 identified with hash marks between the reflectance beams 602. As shown, the wavefront 604 of the reflectance beams 602 is different from the wavefront 603 of the incident light beams 601.

As shown in FIG. 6, the reflectance beams 602 converge on one another. A lens that creates reflectance beams 602 that converge on one another is referred to as a "positive" lens, i.e., a lens with positive focal length. The ability to focus the reflected light, such as with a positive lens, can be useful when the reflected light is used as part of a feedback mechanism, such as when the reflected light is directed to a back monitor photo detector configured to measure the amount of reflected light. A controller, which is coupled to the back monitor photo detector and a light source, receives a signal from the back monitor photo detector. The signal is indicative of the amount of reflected light detected by the back monitor photo detector. The controller provides a control signal to the light source that adjusts the power of the light source such that the power of the light beam from the light source is substantially constant. Using a lens that reflects light in a focused manner, such as with a positive lens, allows for using a smaller photo detector, which may reduce the overall cost of the optical system.

Figure 7:
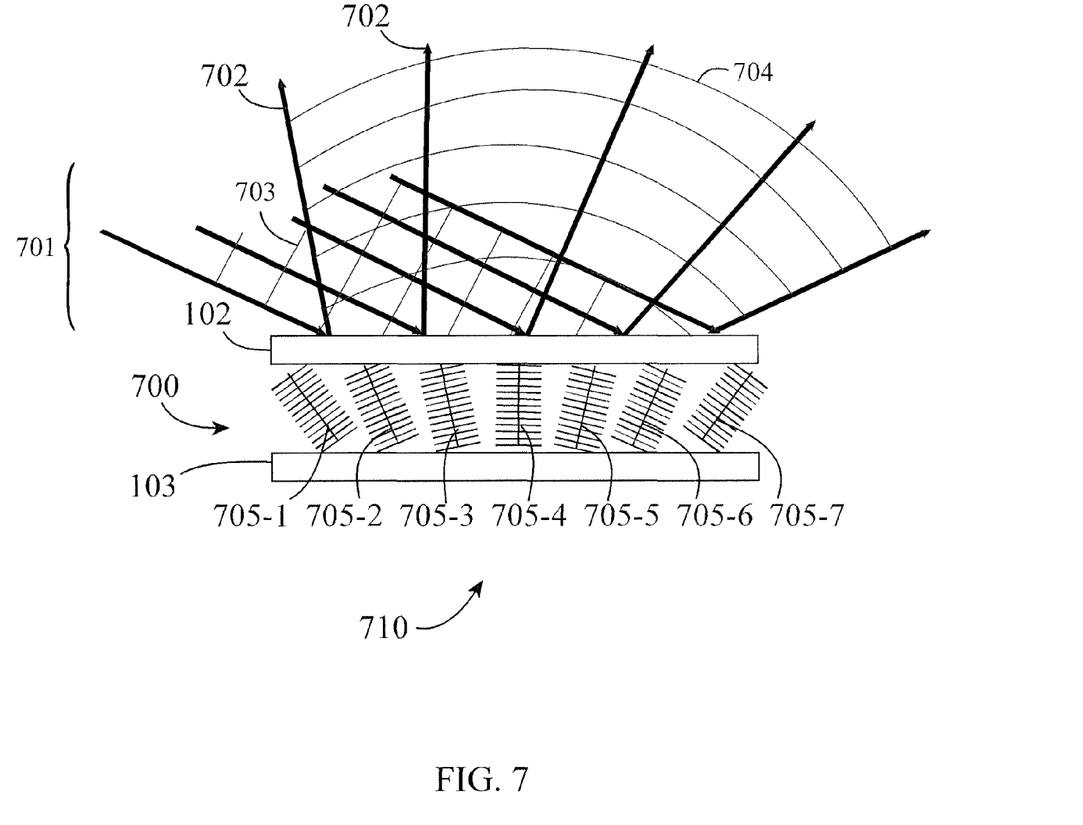
FIG. 7 is a schematic view of light beams reflected from a cholesteric liquid crystal structure in a planar state with inclined domains of the cholesteric liquid crystal having a distribution of orientations, according to another embodiment.

FIG. 7 is a schematic view of light beams reflected from a cholesteric liquid crystal structure 710 in a planar state with inclined domains of cholesteric liquid crystal having a distribution of orientations, according to another embodiment. As shown, the cholesteric liquid crystal structure 710 includes substrate 102, substrate 103, and molecules of cholesteric liquid crystal 700. As also shown, the orientations of helical axes 705-1 to 705-7 of the cholesteric liquid crystal 700 are not uniform relative to the orientation of the substrates 102 and 103.

As a result, for each of a plurality of incident light beams 701 and corresponding reflectance beams 702, the angle of incidence is not equal to the angle of reflectance. The incident light beams 701 are associated with a wavefront 703 identified with hash marks between the incident light beams 701. Also, the reflectance beams 702 are associated with a wavefront 704 identified with hash marks between the reflectance beams 702. As shown, the wavefront 704 of the reflectance beams 702 is different from the wavefront 703 of the incident light beams 701.

As also shown in FIG. 7, the reflectance beams 702 diverge from one another. A lens that creates reflectance beams 702 that diverge from one another is referred to as a "negative" lens, i.e., a lens with negative focal length.

Figure 8:
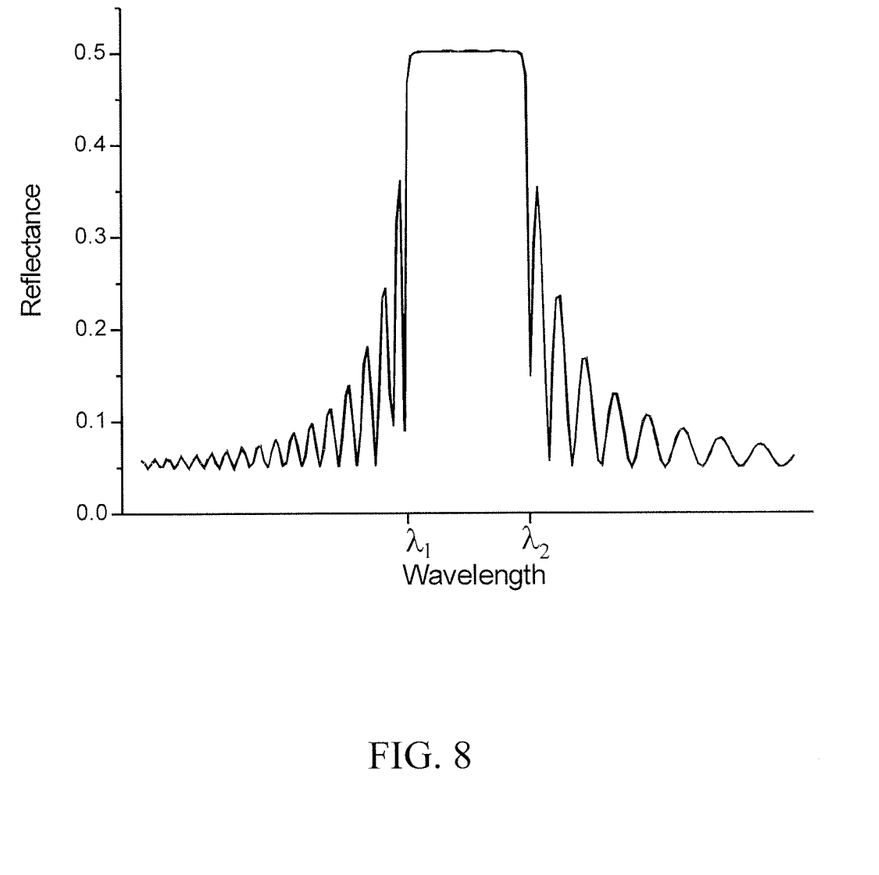
FIG. 8 is a graph illustrating reflectance of a cholesteric liquid crystal structure relative to wavelength of incident light, according to one embodiment.

FIG. 8 is a graph illustrating reflectance of a cholesteric liquid crystal structure relative to wavelength of incident light, according to one embodiment. The cholesteric liquid crystal reflects light of certain wavelengths better than light of other wavelengths. In one embodiment, the cholesteric liquid crystal structure best reflects light having a wavelength between $\lambda_1$ and $\lambda_2$, where:

$$\lambda_1 = P\sqrt{n_o^2 - \sin^2\alpha} \quad \text{(Equation 2),}$$

and $$\lambda_2 = P\sqrt{n_e^2 - \sin^2\alpha} \quad \text{(Equation 3)}$$

P is the pitch length of the chiral periodical structure of the cholesteric liquid crystal in planar state, $n_e$ is the extraordinary refractive index of the locally uniaxial structure, $n_o$ is the ordinary refractive index of the locally uniaxial structure, and $\alpha$ is the angle of incidence. In the case of normal incidence (i.e., $\alpha=0$), the cholesteric liquid crystal having right-handed helicoidal structure reflects right-handed circularly-polarized light wavelengths that lie between $Pn_o$ and $Pn_e$; whereas, the cholesteric liquid crystal having left-handed helicoidal structure reflects left-handed circularly-polarized light with said wavelengths.

When the light refracted in the cholesteric liquid crystal does not propagate along the helical axis, the state of polarization of the selectively reflected light is elliptical. The ellipticity of the reflected light depends on the angle between the direction of light propagation inside the cholesteric liquid crystal layer and the helical axis. After interaction of unpolarized light with cholesteric liquid crystal, around 50% of the light energy is reflected within the range $\lambda_1$ and $\lambda_2$, and around 50% of the light energy is transmitted. This property is shown in FIG. 8 by the reflectance value of approximately 0.5 within the range of wavelengths $\lambda_1$ and $\lambda_2$.

Figure 9:
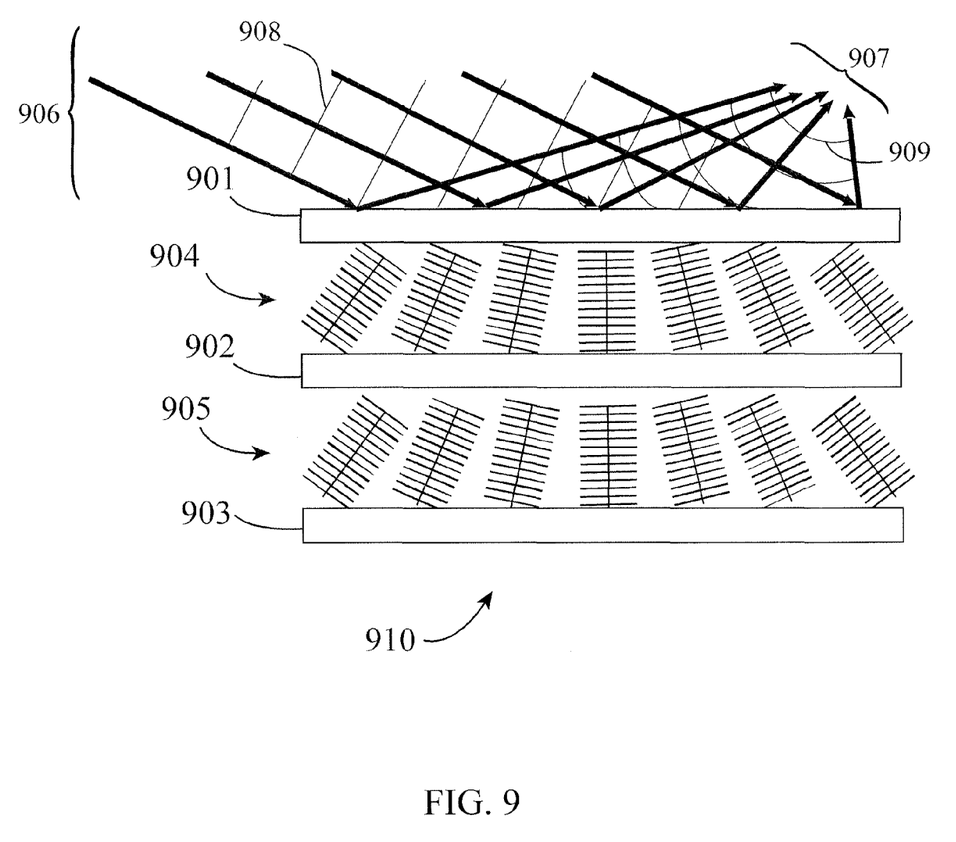
FIG. 9 is a schematic view of a cholesteric liquid crystal structure that includes two layers of cholesteric liquid crystal with opposite handedness, according to one embodiment.

FIG. 9 is a schematic view of a cholesteric liquid crystal structure 910 that includes two layers of cholesteric liquid crystal with opposite handedness, according to one embodiment. As shown, the cholesteric liquid crystal structure 910 includes substrates 901, 902, 903, a first layer 904 of molecules of cholesteric liquid crystal, and a second layer 905 of molecules of cholesteric liquid crystal. As also shown, the orientation of the helical axes of the domains of cholesteric liquid crystal in each layer are not uniform relative to the orientation of the substrates 901, 902, 903.

As a result, for each of a plurality of incident light beams 906 and corresponding reflectance beams 907, the angle of incidence is not equal to the angle of reflectance. The incident light beams 906 are associated with a wavefront 908 identified with hash marks between the incident light beams 906. Also, the reflectance beams 907 are associated with a wavefront 909 identified with hash marks between the reflectance beams 907. As shown, the wavefront 909 of the reflectance beams 907 is different from the wavefront 908 of the incident light beams 906.

In the example shown in FIG. 9, the cholesteric liquid crystal in the first layer 904 and the cholesteric liquid crystal in the second layer 905 have the same pitch, but opposite handedness of the helicoidal structure. Polarization of the incident light is expressed as a sum of two circular polarizations with opposite handedness. For a circularly-polarized light that has a polarization that coincides with the handedness of the cholesteric liquid crystal 904 reflects from the cholesteric liquid crystal 904. Light with orthogonal polarization (i.e., opposite handedness) passes through the cholesteric liquid crystal 904, but reflects from the cholesteric liquid crystal 905. After reflecting from the cholesteric liquid crystal 905, the light passes through the cholesteric liquid crystal 904 again and, together with the light having opposite polarization that initially reflected from the liquid crystal 904, forms the outgoing reflectance beams 907. The cholesteric liquid crystal structure 910 that includes these two layers of the cholesteric liquid crystal reflects 100% of natural light; whereas, a cholesteric liquid crystal structure that includes one layer of cholesteric liquid crystal reflects 50% of natural light.

Figure 10:
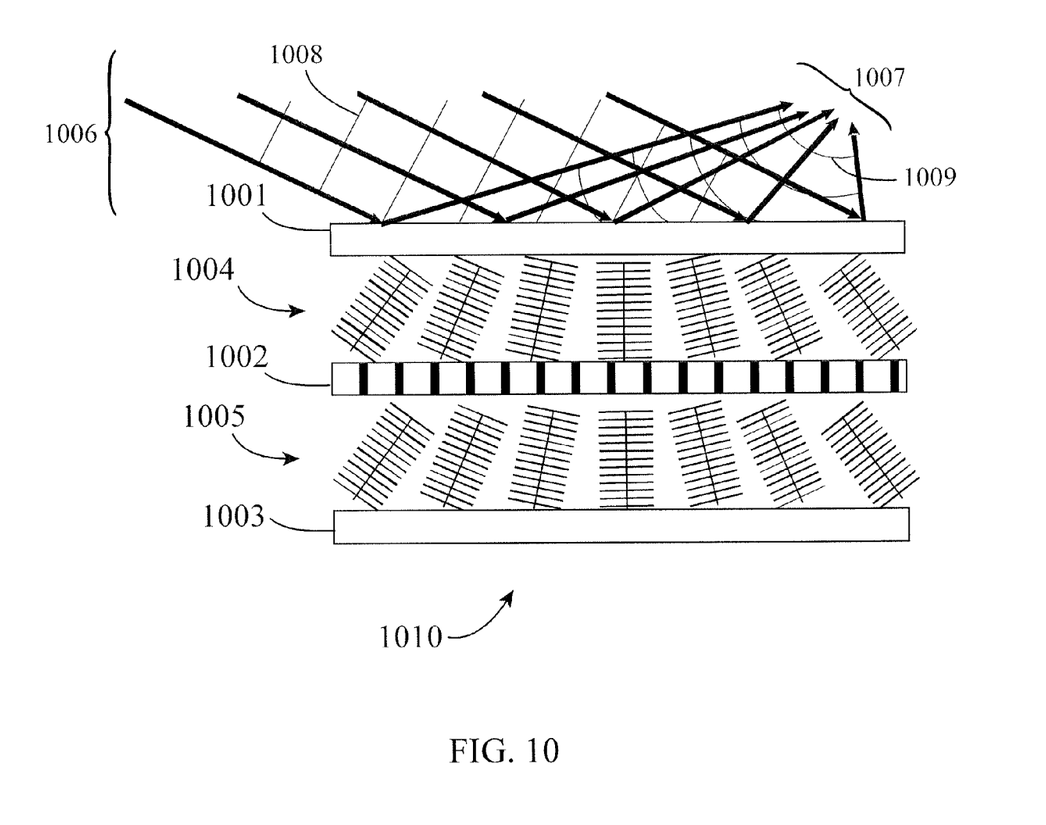
FIG. 10 is a schematic view of a cholesteric liquid crystal structure that includes two layers of cholesteric liquid crystal with the same handedness, according to one embodiment.

FIG. 10 is a schematic view of a cholesteric liquid crystal structure 1010 that includes two layers of cholesteric liquid crystal with the same handedness, according to one embodiment. As shown, the cholesteric liquid crystal structure 1010 includes substrates 1001, 1002, 1003, a first layer 1004 of molecules of cholesteric liquid crystal, and a second layer 1005 of molecules of cholesteric liquid crystal. As also shown, the orientation of the helical axes of the domains of cholesteric liquid crystal in each layer are not uniform relative to the orientation of the substrates 1001, 1002, 1003.

As a result, for each of a plurality of incident light beams 1006 and corresponding reflectance beams 1007, the angle of incidence is not equal to the angle of reflectance. The incident light beams 1006 are associated with a wavefront 1008 identified with hash marks between the incident light beams 1006. Also, the reflectance beams 1007 are associated with a wavefront 1009 identified with hash marks between the reflectance beams 1007. As shown, the wavefront 1009 of the reflectance beams 1007 is different from the wavefront 1008 of the incident light beams 1006.

In the example shown in FIG. 10, the cholesteric liquid crystal in the first layer 1004 and the cholesteric liquid crystal in the second layer 1005 have the same pitch and the same handedness. In one embodiment, the substrate 1002 comprises a birefringent plate 1002. In cholesteric liquid crystal structures that include two layers of cholesteric liquid crystals that have the same pitch and the same handedness, at wavelengths in the range of reflection between $\lambda_1$ and $\lambda_2$, the substrate 1002 acting as a birefringent plate provides a phase retardation multiple $\pi$. Polarization of the incident light is expressed as a sum of two circular polarizations with opposite handedness. A circularly-polarized light having a polarization that coincides with the handedness of the cholesteric liquid crystal 1004 reflects from the layer of cholesteric liquid crystal 1004. The light with orthogonal polarization (i.e., opposite handedness) passes through the cholesteric liquid crystal 1004 and the birefringent plate 1002. The birefringent plate 1002 changes the polarization of the light that passes through it to light of orthogonal polarization (i.e., opposite handedness). After passing through the birefringent plate 1002, the light reflects from the second layer 1005 of cholesteric liquid crystal. A cholesteric liquid crystal structure 1010 that includes these two layers of the cholesteric liquid crystals reflects 100% of natural light; whereas, a cholesteric liquid crystal structure that includes one layer of the cholesteric liquid crystal reflects 50% of natural light.

Figure 11:
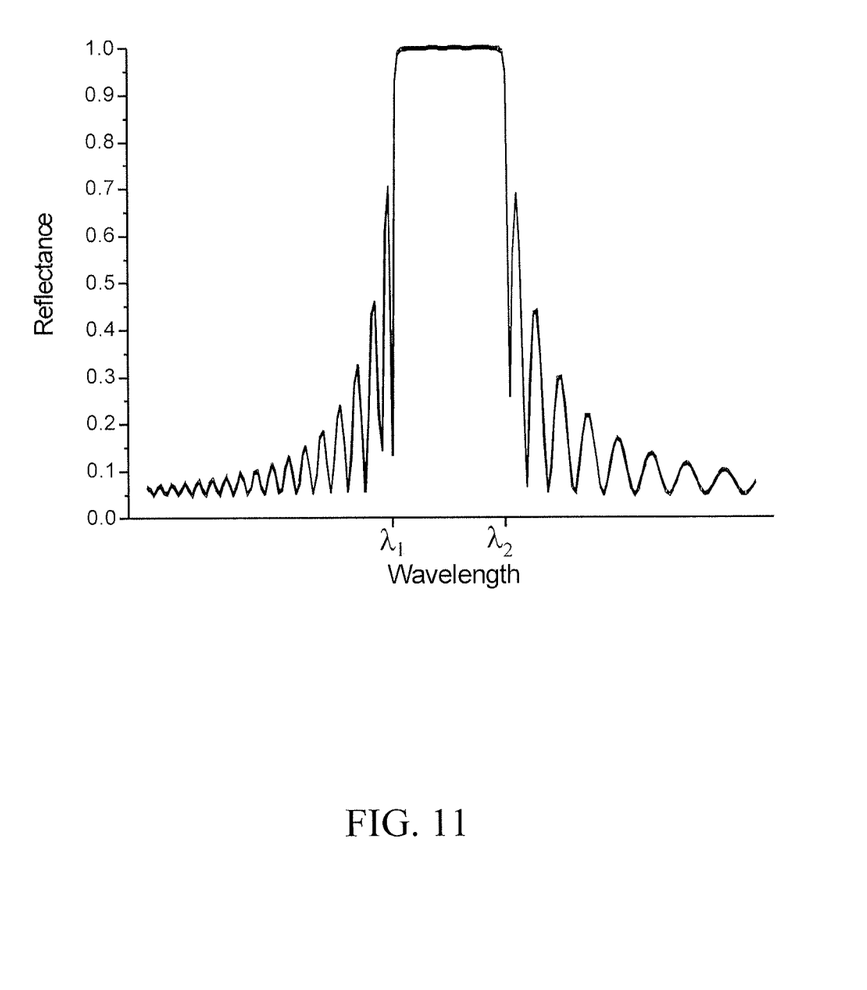
FIG. 11 is a graph illustrating reflectance of a cholesteric liquid crystal structure that includes two layers of cholesteric liquid crystal versus wavelength of incident light, according to one embodiment.

FIG. 11 is a graph illustrating reflectance of a cholesteric liquid crystal structure that includes two layers of cholesteric liquid crystal versus wavelength of incident light, according to one embodiment. As shown, at wavelengths in the range of reflection between $\lambda_1$ and $\lambda_2$, the reflectance is close to 1.0 (i.e., close to 100% reflectance). The graph shown in FIG. 11 corresponds to the reflectance of the cholesteric liquid crystal structure when both of the layers of cholesteric liquid crystal have the same handedness, but are separated by the birefringent plate as shown in FIG. 10, or when the layers of cholesteric liquid crystal have the opposite handedness, as shown in FIG. 9.

Figure 12:
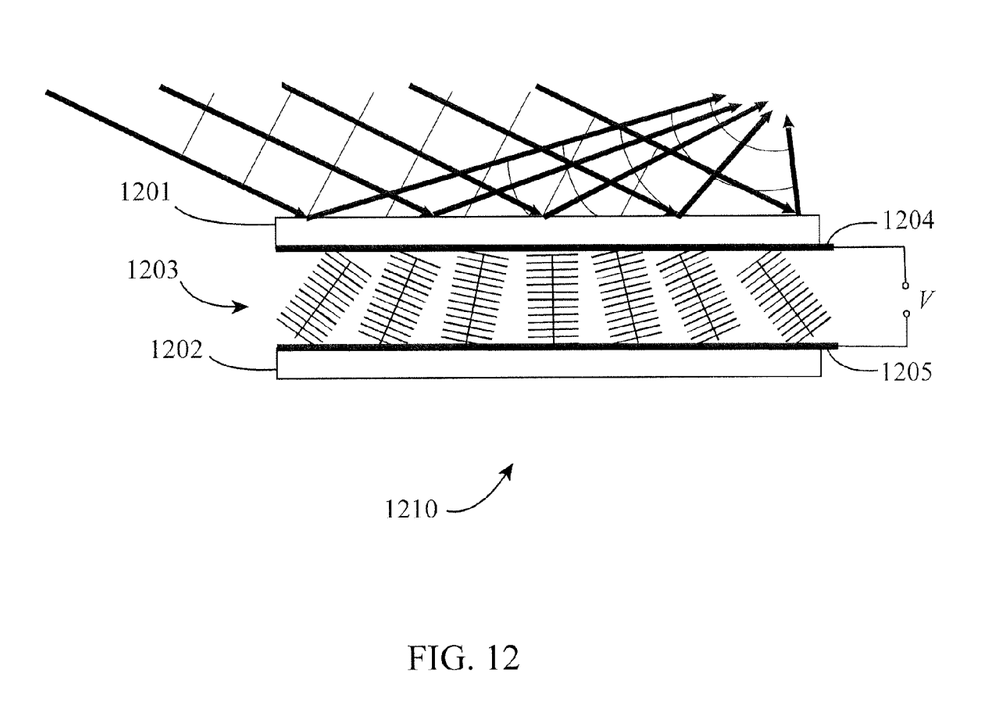
FIG. 12 is a schematic view of light beams reflected from a cholesteric liquid crystal structure including two electrodes, according to one embodiment.

FIG. 12 is a schematic view of light beams reflected from a cholesteric liquid crystal structure 1210 including two electrodes 1204, 1205, according to one embodiment. As shown, the cholesteric liquid crystal structure 1210 includes substrate 1201, substrate 1202, electrodes 1204, 1205, and molecules of cholesteric liquid crystal 1203. The electrode 1204 is positioned on an inside face of the substrate 1201, and the electrode 1205 is positioned on an inside face of the substrate 1202. The cholesteric liquid crystal 1203 is positioned between the inside faces of the substrates 1201, 1202. An electrical or magnetic impulse (shown in FIG. 12 by the symbol V) can be applied across the electrodes 1204, 1205.

According to some embodiments, the cholesteric liquid crystal 1203 changes its state (i.e., between planar state and focal conic state) depending on parameters of the electrical or magnetic impulse applied across the electrodes 1204, 1205. In one embodiment, the cholesteric liquid crystal 1203 is in the planar state when no impulse is applied (e.g., as shown in FIG. 1), the cholesteric liquid crystal 1203 is in the homeotropic state when a high intensity impulse is applied (e.g., as shown in FIG. 3), and the cholesteric liquid crystal 1203 is in the focal conic state when an intermediate intensity impulse is applied (e.g., as shown in FIG. 2). Parameters of the impulse (or a sequence of impulses) that transform the cholesteric liquid crystal from one state to another depend on the principal physical constants of the cholesteric liquid crystal and the thickness of the cholesteric liquid crystal. For example, there are cholesteric liquid crystals that transition to homeotropic state when electrical field reaches intensity 5V/µm. After turning off this electrical field, the cholesteric liquid crystal transition to planar state. However, in one example, if an electric field of intensity 3V/µm is applied, which is not sufficient to transform the cholesteric liquid crystal to homeotropic state, then the cholesteric liquid crystal has focal conic state and will maintain the focal conic state after turning off the electric field.

Figure 13:
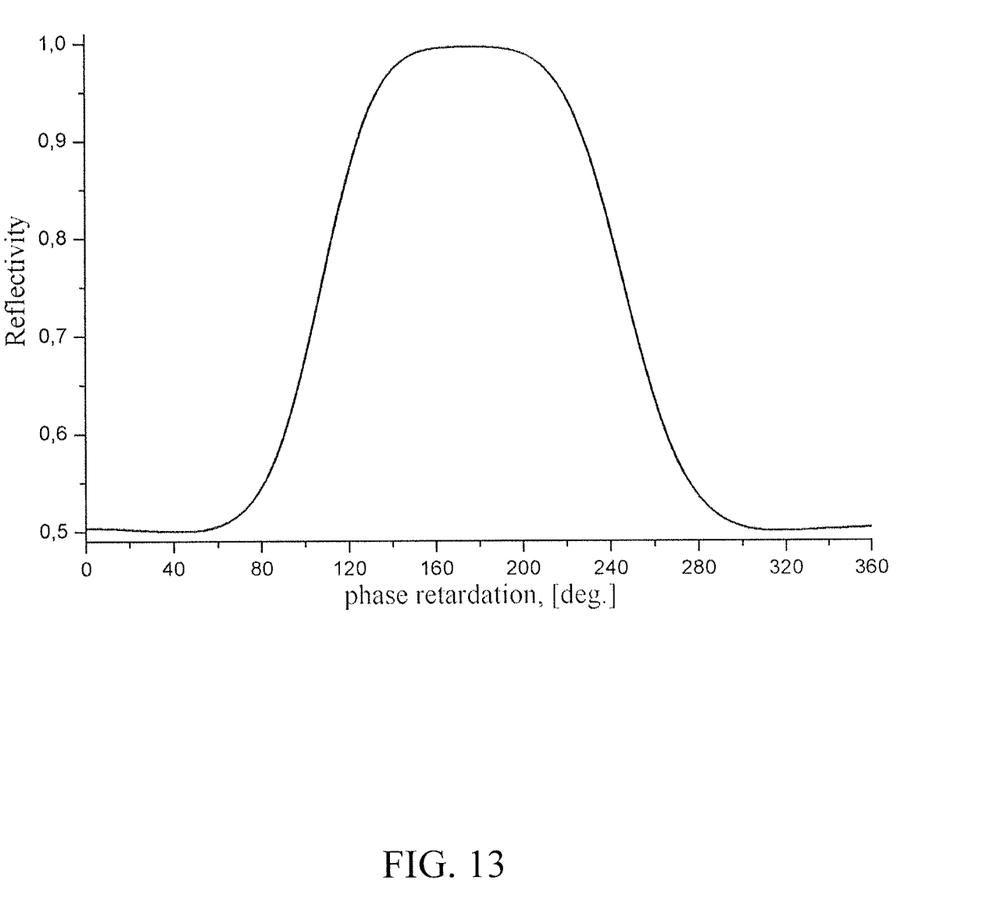
FIG. 13 is a graph illustrating reflectance of a cholesteric liquid crystal structure versus phase retardation of a birefringent plate, according to one embodiment.

FIG. 13 is a graph illustrating reflectance of the cholesteric liquid crystal structure shown in FIG. 10 versus phase retardation of the birefringent plate 1002, according to one embodiment. This graph shows that the retardation of the birefringent plate 1002 is not required to be strictly at 180° ($\pi$) to obtain reflection close to 100%.

In sum, embodiments of the invention provide a liquid crystal optical device that includes at least one layer of cholesteric liquid crystal. The liquid crystal is arranged in domains having helical axes. The helical axes of the domains have a plurality of orientations such that incident light waves having a wavelength within a certain range, when reflected from the liquid crystal optical device, change their wavefront. Accordingly, the incident light waves can be focused onto a particular target.

One aspect of the disclosed optical devices is that the substrates that make up the optical device are flat, and not concave or convex. These optical devices can therefore be suitable for many applications that do not allow for concave or convex lenses.

Another aspect of the disclosed optical devices is that is that the optical devices are reflective in a certain spectral range and transmissive for the rest of the spectrum. Accordingly, the lenses do not absorb light and maintain high optical power. Also, according to various embodiments, the spectral range that is reflective is material-dependent and can be adjusted according to the specific application.

Yet another aspect of the disclosed optical devices is that they are electrically controllable. By adjusting the electrical or magnetic impulse applied to the optical device, the reflectivity can be changed, according to the desired properties of a particular application. For example, in a 3D (three-dimensional) television application, the electrical or magnetic impulse applied to the optical device can be switched ON and OFF to switch the television from operating in a 3D mode to operating in a 2D (two-dimensional) mode.

Embodiments disclosed herein may be used in a wide variety of applications including telecommunications, computer, control, sensor, manufacturing, solar cells and solar cell concentrators, and/or any other suitable application.

Embodiments of the invention have been described above with reference to specific embodiments. Persons skilled in the art, however, will understand that various modifications and changes may be made thereto without departing from the broader spirit and scope of embodiments of the invention, as set forth in the appended claims. The foregoing description and drawings are, accordingly, to be regarded in an illustrative rather than a restrictive sense.

The invention claimed is:

1. A method for reflecting light from a liquid crystal optical device, comprising:
   applying a voltage across a first electrode and a second electrode, wherein a layer of cholesteric liquid crystal is disposed between the first electrode and the second electrode, wherein the cholesteric liquid crystal comprises a plurality of domains, each domain having a helical axis, the helical axes of the plurality of domains having different orientations, wherein the different orientations are configured to cause the layer of cholesteric liquid crystal to act as a positive or negative lens with respect to a range of wavelengths such that light within the range of wavelengths incident upon the first substrate layer is reflected by the layer of cholesteric liquid crystal in a converging or diverging manner; and
   varying the voltage to modify a degree of convergence or divergence caused by the layer of cholesteric liquid crystal;
   wherein the layer of cholesteric liquid crystal is substantially flat.

2. The method according to claim 1, wherein at least one of the first electrode and the second electrode is transparent, and the layer of cholesteric liquid crystal changes state based on varying the voltage.

3. The method according to claim 1, wherein the liquid crystal optical device comprises two layers of cholesteric liquid crystal, wherein the two layers of cholesteric liquid crystal have the same handedness or opposite handedness.

4. The method according to claim 3, wherein the liquid crystal optical device comprises a layer of birefringent material disposed between the two layers of cholesteric liquid crystal.

5. The method according to claim 3, wherein the first electrode is disposed on a first substrate layer that is substantially flat, and the second electrode is disposed on a second substrate layer that is substantially flat.

* * * * *